Nov. 3, 1931. C. R. NELSON 1,830,556

ICE MUD HOOK AND CROSS CHAIN

Filed March 18, 1931

Carl R. Nelson
INVENTOR

Patented Nov. 3, 1931

1,830,556

UNITED STATES PATENT OFFICE

CARL RANDOLPH NELSON, OF LA GRANGE, ILLINOIS

ICE MUD HOOK AND CROSS CHAIN

Application filed March 18, 1931. Serial No. 523,531.

This invention relates to certain new and useful improvements in traction elements having special application upon motor vehicle wheels.

One of the principal objects of the invention consists in the arrangement of a multiplicity of traction elements having flexible connections therebetween.

Another of the objects of the invention contemplates the provision and arrangement of a resilient casing for the traction device exposing only the penetrating or gripping portions of the traction elements.

More specifically stated the device is provided with attaching elements upon the ends thereof having the portions thereof in communication with the flexible connecting elements entirely housed within said casing.

With the above and other objects in view, the invention further consists of the following novel features and details of construction, to be hereinafter more fully described, illustrated in the accompanying drawings and pointed out in the appended claim.

In the drawings:—

Figure 2:
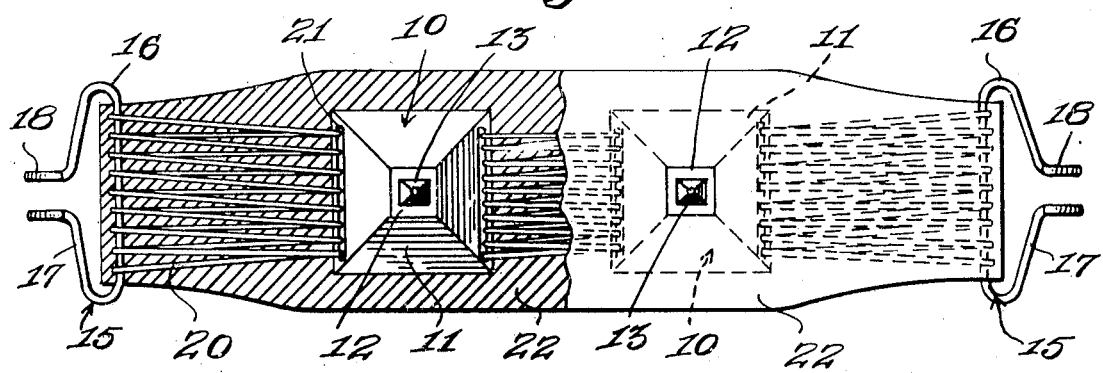
Figure 2 is a top plan view of the invention partly broken away to illustrate the construction thereof.

Referring to the drawings in detail wherein like characters of reference denote corresponding parts, the reference character 10 indicates generally a traction element of plate like formation having facets 11 inclined from the marginal edges thereof toward the center for communication with sleeve members 12. Traction elements 13, provided with threaded shanks, are adjustably positioned within the sleeves 12 in the manner suggested in Figure 3 of the drawings. Attaching members 15 bent upon themselves, as at 16, at points spaced from the ends thereof, have the free ends 17 thereof outwardly projecting from planes parallel to the body of the connecting elements 15 in the manner suggested in Figure 2 of the drawings.

Figure 1:
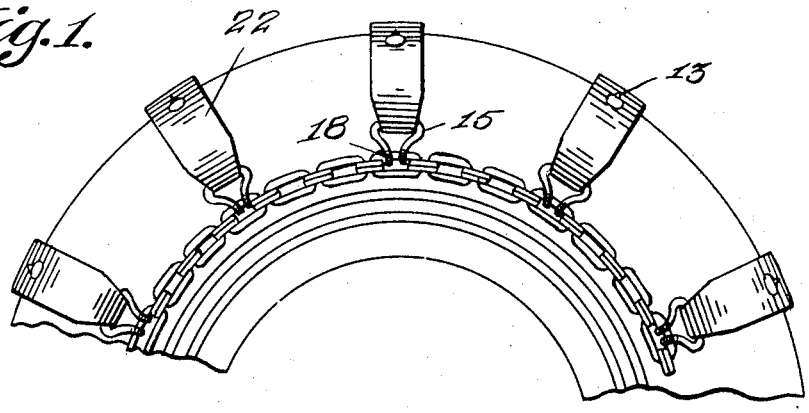
Figure 1 is a side elevation of the present invention in active position upon a vehicle tire.

Open hooks 18, formed upon the extremities of the free ends 17 and disposed in planes at right angles to the body of the connecting elements, are designed to accommodate the links of side chains in the manner shown in Figure 1.

The traction plates 10 are spaced given distances apart from each other and the connecting elements 15, and associated for active use through the employment of flexible lacings 20, which as shown are passed through slots 21 in the ends of the plates 10. The major portions of the aforementioned assemblage are embedded within a resilient casing 22 save for the traction or penetrating elements 13, the free ends 17 and hooks 18 whereby injury to the side walls or tread of the tire will be prevented.

Although the several parts of the traction device are housed within the flexible casing 22, it is to be noted that the resiliency thereof is to be employed only upon the inner surface thereof against the tread and side walls of the tire to prevent loosening of the connections of the device with the side chains.

Figure 3:
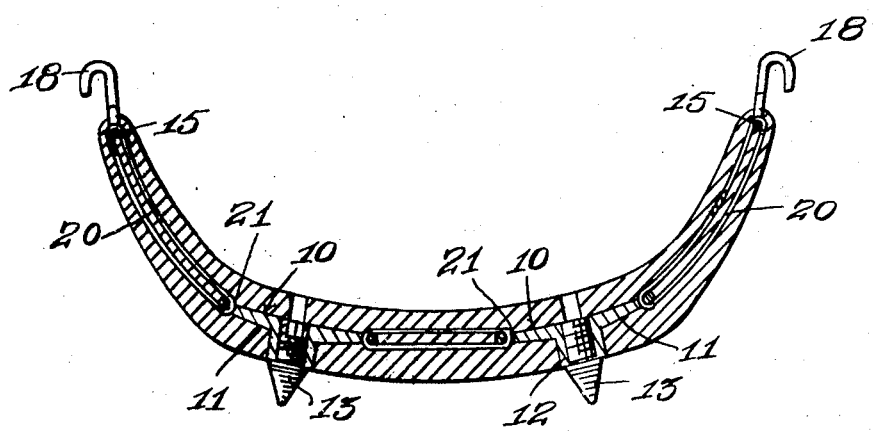
Figure 3 is a longitudinal sectional view taken through the invention when disposed in active position.

As suggested in Figure 3 of the drawings, the traction elements or calks are screwed into the sleeve members 12 from the inner sides of the plates 10. Openings are provided for the purpose in the flexible casing 22 through which the shanks, not shown, of the conventional forms of set screw wrenches may be projected for accommodation within socket openings in the calks or traction elements.

The invention is susceptible of various changes in its form, proportions and minor details of construction and the right is herein reserved to make such changes as properly fall within the scope of the appended claim.

Having described the invention what is claimed is:

An anti-skid chain side chain construction comprising a multiplicity of plate members having slots arranged in the sides thereof, connecting elements arranged in alignment with the plates having attaching hooks upon the ends thereof, flexible connections laced between the plates and connections, a resilient casing housing the plates and lacings, and traction elements having detachable connection with the plates projecting outwardly beyond said casing.

In testimony whereof I affix my signature.

CARL RANDOLPH NELSON.